United States Patent [19]

Hensler

[11] Patent Number: 4,802,755
[45] Date of Patent: Feb. 7, 1989

[54] DUAL PURPOSE SUNGLASS LENS HAVING GOLD APPEARANCE AND METHOD OF MANUFACTURE

[75] Inventor: J. Raymond Hensler, Rochester, N.Y.

[73] Assignee: Bausch & Lomb Incorporated, Rochester, N.Y.

[21] Appl. No.: 34,511

[22] Filed: Apr. 6, 1987

[51] Int. Cl.[4] .............................. G02C 7/10; G02B 5/23
[52] U.S. Cl. ..................................... 351/163; 350/354; 351/177; 427/166
[58] Field of Search ............... 351/163, 164, 165, 166, 351/177; 427/166; 350/354

[56] References Cited

U.S. PATENT DOCUMENTS 3,460,960  8/1969  Francel et al. .................. 351/163 X
3,516,720  6/1970  Mauer ............................. 351/163 X
3,936,579  2/1976  Ogasawara et al. ............. 351/163 X Primary Examiner—John K. Corbin
Assistant Examiner—Scott J. Sugarman
Attorney, Agent, or Firm—Bernard D. Bogdon; DeWitt M. Morgan; John S. Norton

[57] ABSTRACT

A method of manufacturing a dual purpose sunglass lens having a gold appearance, as well as the lens itself, is described wherein a photochromic lens is coated on its front and rear surfaces with a titanium monoxide material. An antireflection substance is overlyed onto the titanium monoxide deposited on the rear surface. The sunglass lens has a transmittance of approximately 10% at 20° C. and a transmittance of approximately 5% at 0° C. in bright sunlight.

6 Claims, 1 Drawing Sheet

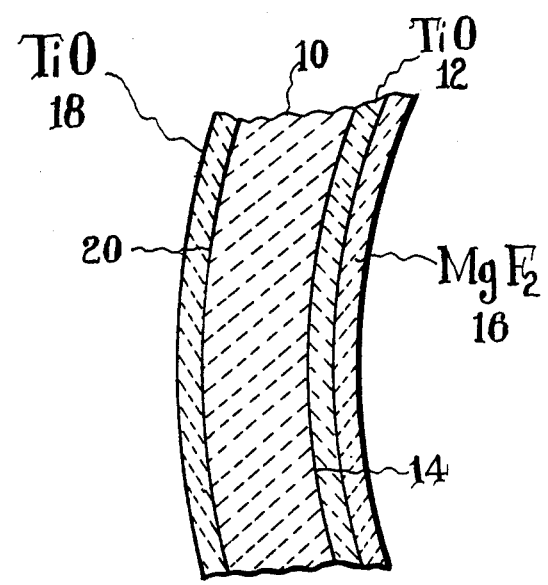

DUAL PURPOSE SUNGLASS LENS HAVING GOLD APPEARANCE AND METHOD OF MANUFACTURE

CROSS-REFERENCE TO RELATED APPLICATION

The present application is related to Ser. No. 034,512 entitled "Surface Coated Glass Article Having Gold Appearance and Method of Manufacture" filed concurrently herewith for inventor J. R. Hensler.

BACKGROUND OF THE INVENTION

1. Field of the Invention

The present invention is directed toward a sunglass lens having a gold appearance which under normal conditions meets the requirements of a General Purpose lens yet when encountering more extreme conditions becomes a Special Purpose lens.

2. Description of the Prior Art

Presently, sunglass lenses fall within two categories of use. The first category known as General Purpose encompasses sunglass lenses which have a light transmission characteristic of approximately 8%–40% in normal ambient temperatures. Transmittance within this range assures that all colors of the spectrum are truly rendered and the lens may be worn for General Purpose use. Examples of this type of lens are the G-15 ® and G-31 ® line of sunglass lenses available from Bausch & Lomb Incorporated of Rochester, N.Y.

Additionally, within the bounds of General Purpose lenses, are those lenses which incorporate photochromic characteristics. Glasses utilizing photochromic lenses may be worn indoors for general ophthalmic wear but have the capability of darkening from their normal state when exposed to direct sunlight. However, the degree of darkening also depends on the ambient temperature. For example, as the ambient temperature decreases, the color of the photochromic lens darkens proportionately. As mentioned previously, photochromic lenses fall within the scope described for General Purpose lenses only. Their transmittance will vary, depending on the intensity of sunlight and the ambient temperature to which the lens is being exposed. Examples of photochromic lenses are Photochromic Gray and Photochromic Brown and Ambermatic ®, all available from Bausch & Lomb.

A second category of sunglass lenses is known and is referred to as Special Purpose lenses. This category includes those lenses which are designed to function in more extreme conditions, such as are encountered on ski slopes where bright sunlight, intense reflection from the snow and low temperatures occur. Examples of such sunglasses utilizing Special Purpose lenses are available from Vuarnet (Nautilux and Skilynx) and Bausch & Lomb (Weatherbeater ®). Lenses in this category are quite dark and, generally, have a transmittance of approximately five percent so as to provide protection for these special circumstances. Moreover, as the lenses are designed for a special purpose, they have no need to pass any color recognition tests. The lenses are so dark that recognition of the red, yellow and green colors of a traffic signal light as set forth by the American National Standards Institute, Inc. (ANSI) in their "Requirements for Nonprescription Sunglasses and Fashion Eyewear" 280.3-1977 is not possible. Accordingly, the lenses are not recommended for General Purpose wear.

The sunglass lens of the present invention provides a lens which meets the standards set forth for General Purpose use and also meets the requirements of Special Purpose lenses. Additionally, the sunglass lens of the present invention provides a lens which has an attractive gold surface color.

SUMMARY OF THE INVENTION

In accordance with the present invention, a dual purpose photochromic sunglass lens having a gold appearing surface is provided. The photochromic sunglass lens has a titanium oxide coating applied to the front and rear surfaces with an antireflection coating overlying the titanium monoxide on the rear surface. The lens has a transmittance of approximately 10% at 20° C. and approximately 5% at 0° C. in bright sunlight.

The new method of manufacturing a gold appearing photochromic sunglass lens comprises the steps of depositing a titanium monoxide coating of predetermined thickness on the front and rear surfaces of the lens and overlying an antireflectant coating on the titanium monoxide applied to the rear surface.

BRIEF DESCRIPTION OF THE DRAWING

The single drawing is an enlarged partial sectional view of an embodiment of the invention comprising a photochromic sunglass lens 10 having a titanium monoxide coating 12 applied to the concave (rear) surface 14 of the lens 10. A magnesium fluoride coating 16 overlays the titanium monoxide coating 12. Additionally, a further titanium monoxide coating 18 is applied to the convex (front) surface 20 of the lens 10.

DETAILED DESCRIPTION OF THE PREFERRED EMBODIMENT

It is well known that the photochromic sunglass lenses darken when exposed to sunlight. Additionally, as the ambient temperature decreases, the degree of darkening increases. A special lens within the photochromic lens group, is sold by Bausch & Lomb under the tradename "Ambermatic ®". This lens is made from a borosilicate glass which has been specially treated so as to have an amber appearing color. The Ambermatic ® photochromic lens has a fixed absorption which is particularly high in the blue spectral region. Accordingly, this lens enhances contrast.

I have found that the overall transmittance of a photochromic lens 10, such as an Ambermatic ® lens, can be reduced by coating the front (convex) surface 20 and rear (concave) surface 14 of the lens 10 with a titanium monoxide material 12 and 18. The titanium monoxide material may include minor amounts or traces of other oxides, such as molybdenum, niobium and zirconium oxides. Additionally, higher oxides of titanium may also be present in minor amounts. Satis America of Cleveland, Ohio sells a suitable titanium monoxide material designated as "Gray F". A similar substance designated "Grau Pulver" was until recently available from EM Industries of Hawthorne, N.Y. This material has been widely used to give a gray tint to glass surfaces.

As set forth in my previously referenced copending patent application, Ser. No. 034,512, I have found that a titanium monoxide material applied to a glass lens surface produced a sophisticated gold appearance. Back reflection of light from the titanium monoxide material was overcome by applying a selected anti-reflectant substance to the titanium monoxide to reduce such undesirable reflectance of light. The selected anti-reflectant substance has a refractive index of approximately 1.55 to 1.7.

Pursuant to the precepts of the present invention I found that the titanium monoxide coating 18 produces a most pleasing gold appearance when divided between the front 20 and rear 14 surfaces of the lens 10. The titanium monoxide is applied to the front surface 20 of the lens 10 by a vapor deposition process in a thickness appropriate to produce a desired level of transmittance of 43%. The deposition of the titanium monoxide coating 18 is optically monitored, controlled and automatically stopped by appropriate and well known monitoring equipment, such as is set forth and described in my previously referenced copending patent application Ser. No. 034,512. In this monitoring equipment, the titanium monoxide is deposited onto a clear glass device referred to as a witness plate. The transmission through the witness plate is continually monitored. When the desired transmittance is achieved the deposition is automatically stopped.

The antireflectant characteristics of the magnesium fluoride material 16 are known to the optical industry. It was selected for this application because it yields a refractive index of about 1.4 when deposited on the titanium monoxide.

By experimentation with the previously referenced monitoring equipment, I found that by depositing a combination of titanium monoxide 12 and magnesium fluoride 16 to the concave surface 14 of the lens 10 which produces a transmission reading at the witness plate of 48%, an overall desirable lens transmittance of 20%±3% is a achieved when the titanium monoxide coating 18 is in place. Additionally, the reflectivity from the titanium monoxide coating 12 was substantially reduced.

As mentioned hereinbefore, the titanium monoxide coatings 12 and 18 produce a pleasing gold surface color on the lens 10. In addition, the titanium monoxide coating 18 applied to the front surface 20 has the effect of diminishing the photochromic response (darkening) of the lens. This follows from the fact that ultraviolet light, which stimulates the photochromic response in lens 10 and causes it to darken, is attenuated by the coating 18, as is visible light.

I have found that when a sunglass lens 10, constructed according to the principles of the present invention, is exposed to sunlight at an ambient temperature of 20° C., the transmittance of the lens is reduced to approximately 10%, e.g. 8%–12%. Surprisingly, when the same lens is exposed to sunlight at 0° C. the transmittance of the lens is reduced to about 5%, e.g. 4%–6%.

Thus, a sunglass lens 10 is produced which meets the requirements of a General Purpose lens at 20° C., yet also meets the requirements of a Special Purpose lens at 0° C. Additionally, a sunglass lens is produced which has an attractive and desirable gold surface color.

It is to be understood that while a certain form of this invention has been illustrated and described, it is not limited thereto, except so far as such limitations are included in the following claims.

I claim:

1. A dual purpose sunglass lens having a gold appearing surface, comprising:
   a photochromic sunglass lens having titanium monoxide coatings deposited on the concave and convex surfaces thereof and a magnesium fluoride coating deposited onto the titanium monoxide coating applied to the concave surface, said sunglass lens having a gold appearing surface color and a transmittance of approximately 10% at 20° C. and a transmittance of approximately 5% at 0° C. in bright sunlight.

2. A method of manufacturing a dual purpose photochromic sunglass lens having a gold appearing color, comprising the steps of:
   (a) depositing a titanium monoxide coating of predetermined thickness upon the convex and concave surfaces of a photochromic sunglass lens; and
   (b) depositing an antireflection coating of predetermined thickness on said titanium monoxide coating deposited on the concave surface, whereby said coated photochromic sunglass lens has a gold appearing color and a transmittance of approximately 10% at 20° C. and a transmittance of approximately 5% at 0° C. in bright sunlight.

3. The method as set forth in claim 2, wherein the antireflection coating is magnesium fluoride.

4. The method as set forth in claim 2 wherein the titanium oxide coatings and antireflection coating are deposited by vapor deposition and the transmission of the deposited coatings is measured by an optical monitoring device which automatically stops deposition when a desired level of transmittance is achieved.

5. The method as set forth in claim 2 wherein said titanium monoxide also contains minor amounts of molybdenum, niobium and zirconium oxides.

6. The method as set forth in claim 4 wherein the desired level of transmittance of the finished lens is 20%±3% when not exposed to sunlight.

* * * * *